US012693808B2

(12) United States Patent
Zhang et al.

(10) Patent No.: US 12,693,808 B2
(45) Date of Patent: Jul. 28, 2026

(54) DATA READ/WRITE METHOD, CONTROLLER, AND STORAGE DEVICE

(71) Applicant: HUAWEI TECHNOLOGIES CO., LTD., Shenzhen (CN)

(72) Inventors: Yu Zhang, Shenzhen (CN); Zhixiang Cheng, Hangzhou (CN); Wei Zhou, Hangzhou (CN); Zhibei Li, Shenzhen (CN); Nan Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 19/025,576

(22) Filed: Jan. 16, 2025

(65) Prior Publication Data

US 2025/0156119 A1 May 15, 2025

Related U.S. Application Data

(63) Continuation of application No. PCT/CN2023/094700, filed on May 17, 2023.

(30) Foreign Application Priority Data

Jul. 28, 2022 (CN) .......................... 202210900732.0

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,210,004 B2 | 4/2007 | Guha et al. | |
| 8,400,864 B1 | 3/2013 | Mccombs | |
| 9,261,940 B2 | 2/2016 | Kim et al. | |

(Continued)

FOREIGN PATENT DOCUMENTS

| | | | | |
|---|---|---|---|---|
| CN | 111381777 A | 7/2020 | | |
| KR | 20120074612 A | * 7/2012 | ............. | G06F 12/02 |

OTHER PUBLICATIONS

International Search Report and Written Opinion in International Appln. No. PCT/CN2023/094700, mailed on Jun. 23, 2023, 14 pages (with English translation).

(Continued)

*Primary Examiner* — Brian R Peugh
(74) *Attorney, Agent, or Firm* — Fish & Richardson P.C.

(57) ABSTRACT

Example data read/write methods and apparatus are described. One example method includes determining, by a controller, a maximum quantity L of data channels used by the controller in a same time period to perform write operations of data on the M storage units based on a current threshold of the storage device, current consumption of performing write operations of data by M storage units, and current consumption of performing write operations on the M storage units by the controller by using a single data channel, where M is a positive integer less than or equal to Q. The controller performs write operations of data on the M storage units by using a maximum of L data channels in the same time period.

20 Claims, 7 Drawing Sheets

500

A controller determines, based on a current threshold of a storage device, current consumption of performing write operations of data by M storage units in a same time period, and current consumption of performing write operations of data on the M storage units by the controller by using a single data channel, a maximum quantity L of data channels used by the controller in the same time period to perform write operations of data on the M storage units

510

The controller performs write operations of data on the M storage units by using a maximum of L data channels in the same time period

520

(56) References Cited

U.S. PATENT DOCUMENTS

| | | | |
|---|---|---|---|
| 9,293,173 B2 | 3/2016 | Lee et al. | |
| 9,361,951 B2 | 6/2016 | Sommer et al. | |
| 9,368,214 B2 | 6/2016 | Kasorla et al. | |
| 9,875,049 B2 | 1/2018 | Erez et al. | |
| 10,013,345 B2 | 7/2018 | Erez et al. | |
| 10,095,412 B2 | 10/2018 | Hsu et al. | |
| 10,120,817 B2 | 11/2018 | Margetts et al. | |
| 11,079,829 B2 | 8/2021 | Parry et al. | |
| 2014/0112079 A1 | 4/2014 | Wakrat et al. | |
| 2018/0285289 A1* | 10/2018 | Pihlman | G06F 9/4401 |
| 2021/0149828 A1 | 5/2021 | Park et al. | |

OTHER PUBLICATIONS

Extended European Search Report in European Appln. No. 23845001. 9, mailed on Sep. 1, 2025, 8 pages.

* cited by examiner

Connection and communication

NAND LUNs

LUN-Q

Current

LUN-Q

Time

Current

LUN-Q-1

Delay

Time

500

A controller determines, based on a current threshold of a storage device, current consumption of performing write operations of data by M storage units in a same time period, and current consumption of performing write operations of data on the M storage units by the controller by using a single data channel, a maximum quantity L of data channels used by the controller in the same time period to perform write operations of data on the M storage units

510

The controller performs write operations of data on the M storage units by using a maximum of L data channels in the same time period

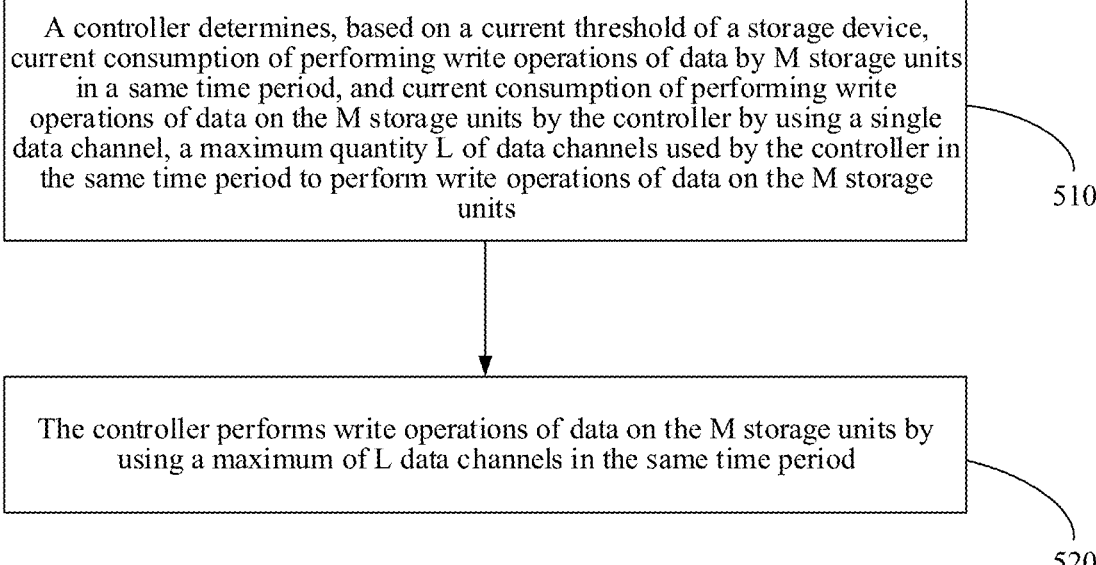

Timer

Current detection module

Current calculation module

Storage module

Controller

Update of a current consumption timetable

Management of a data DMA concurrent write operation

Storage unit

FIG. 6

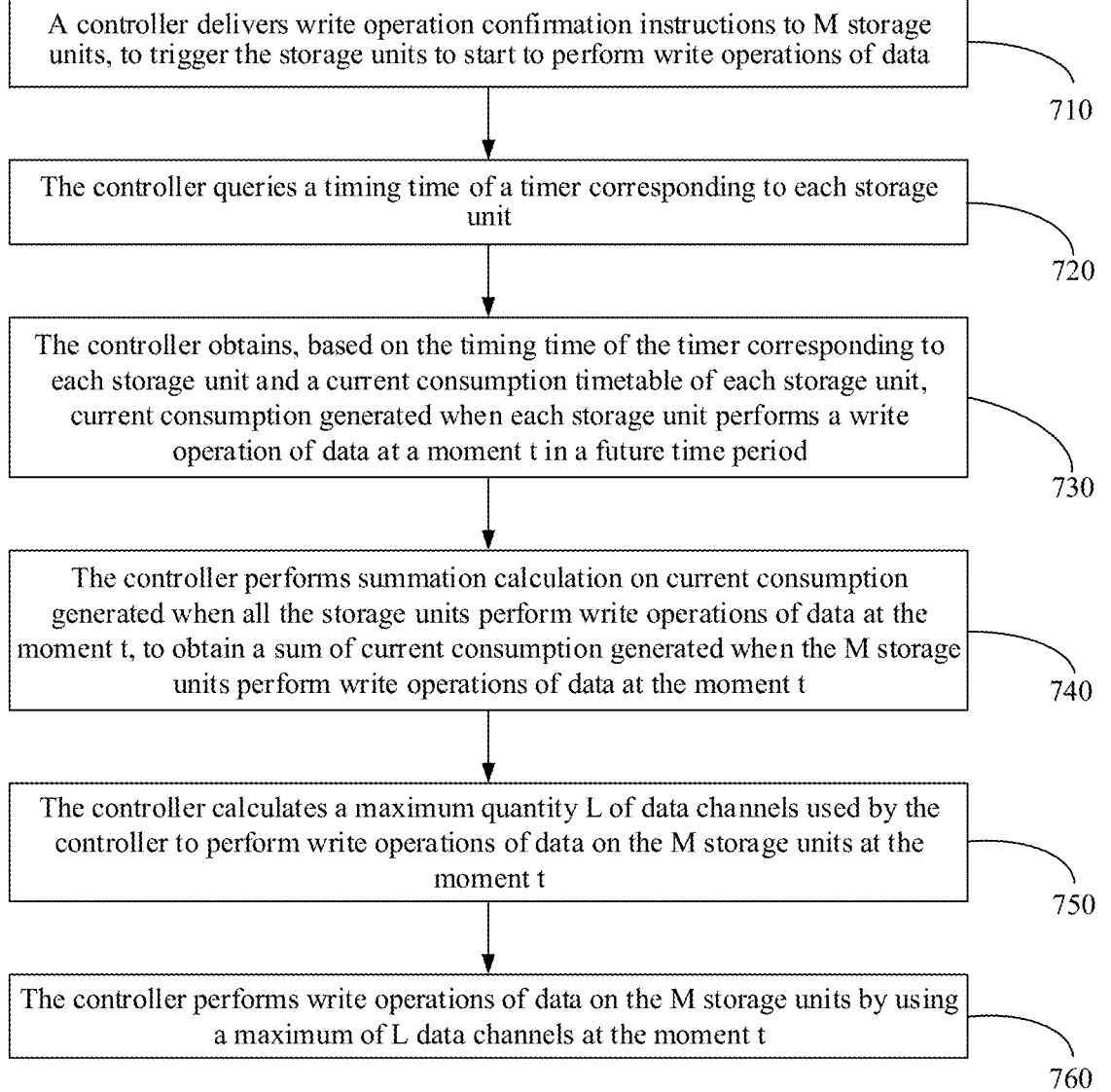

A controller delivers write operation confirmation instructions to M storage units, to trigger the storage units to start to perform write operations of data

710

The controller queries a timing time of a timer corresponding to each storage unit

720

The controller obtains, based on the timing time of the timer corresponding to each storage unit and a current consumption timetable of each storage unit, current consumption generated when each storage unit performs a write operation of data at a moment t in a future time period

730

The controller performs summation calculation on current consumption generated when all the storage units perform write operations of data at the moment t, to obtain a sum of current consumption generated when the M storage units perform write operations of data at the moment t

740

The controller calculates a maximum quantity L of data channels used by the controller to perform write operations of data on the M storage units at the moment t

750

The controller performs write operations of data on the M storage units by using a maximum of L data channels at the moment t

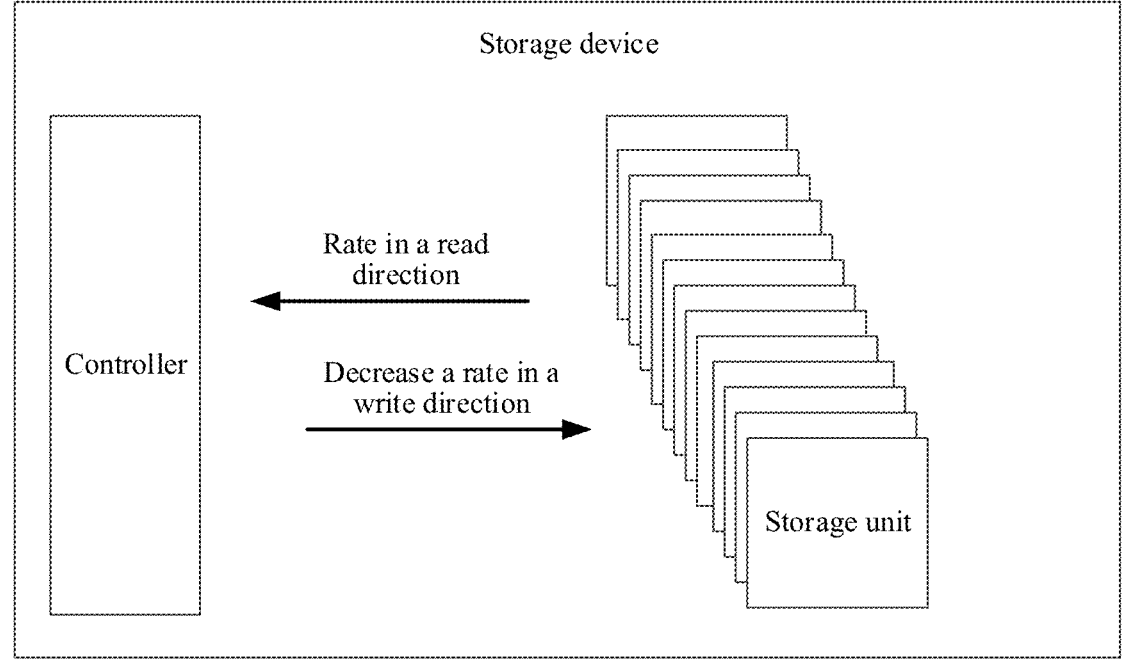

FIG. 8

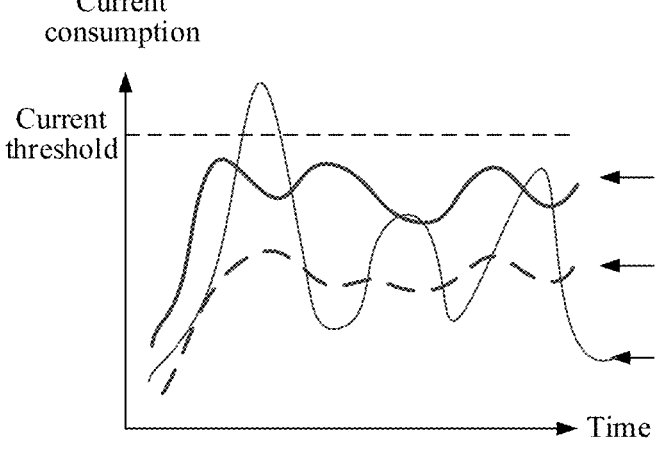

Dynamically adjust a quantity of data channels used by a controller in a same time period to perform write operations of data on eight storage units Dynamically adjust a quantity of data channels used by the controller in the same time period to perform write operations of data on six storage units The controller performs write operations of data on the six storage units by using a maximum quantity of data channels in the same time period

DATA READ/WRITE METHOD, CONTROLLER, AND STORAGE DEVICE

CROSS-REFERENCE TO RELATED APPLICATIONS

This application is a continuation of International Application No. PCT/CN2023/094700, filed on May 17, 2023, which claims priority to Chinese Patent Application No. 202210900732.0, filed on Jul. 28, 2022. The disclosures of the aforementioned applications are hereby incorporated by reference in their entireties.

TECHNICAL FIELD

This application relates to the communication field, and more specifically, to a data read/write method, a controller, and a storage device.

BACKGROUND

A solid-state storage device mainly includes a controller and several NAND logical units (logical units, LUNs). Each NAND LUN includes a buffer and a NAND array (array). The controller usually has a plurality of data channels, and each data channel may be connected to a plurality of NAND LUNs to increase a storage capacity of the storage device. In addition, NAND array concurrent operations of a plurality of NAND LUNs may be used to improve bandwidth performance of a read/write operation of the storage device. The NAND array concurrent operations mean that buffers in the plurality of NAND LUNs perform write operations or read operations of data on corresponding NAND arrays in a same time period.

The solid-state storage device has a very high requirement on power consumption. To ensure power integrity of the storage device, an application platform usually limits a peak value of current consumption $I_{CC}$ corresponding to a power supply voltage (volt current condenser, VCC) of a power supply circuit of the solid-state storage device, to avoid system failure caused due to an excessively large voltage drop in a power supply line. The current consumption $I_{CC}$ of the storage device is mainly from two aspects: data direct memory access (data direct memory access, Data DMA) concurrent operations of a plurality of data channels and the NAND array concurrent operations of the plurality of NAND LUNs. After current consumption generated in the two aspects is added, the current consumption may exceed a limit of a peak current of the storage device in some time periods. The data DMA concurrent operations mean that the controller performs write operations or read operations of data on a plurality of NAND LUNs by using the plurality of data channels in a same time period, resulting in very high power consumption of the storage device.

SUMMARY

This application provides a data read/write method, a controller, and a storage device, to reduce a peak current of the storage device while ensuring bandwidth performance of a write operation of the storage device.

According to a first aspect, a data read/write method is provided and applied to a storage device. The storage device includes a controller and Q storage units. The controller is connected to the Q storage units by using N data channels, N is a positive integer greater than or equal to 2, and Q is a positive integer greater than or equal to N. The method includes: The controller determines, based on a current threshold of the storage device, current consumption of performing write operations of data by M storage units in the Q storage units in a same time period, and current consumption of performing write operations of data on the M storage units by the controller by using a single data channel in the N data channels, a maximum quantity L of data channels used by the controller in the same time period to perform write operations of data on the M storage units, where L is a positive integer less than N, and M is a positive integer less than or equal to Q; and the controller performs write operations of data on the M storage units by using a maximum of L data channels in the same time period.

Based on the foregoing technical solution, the controller determines, based on the current threshold of the storage device, the current consumption of performing write operations of data by the M storage units in the same time period, and the current consumption of performing write operations of data on the M storage units by the controller by using a single data channel, the maximum quantity L of data channels used by the controller in the same time period to perform write operations of data on the M storage units; and the controller performs write operations of data on the M storage units by using a maximum of L data channels in the same time period, to avoid a case in which a peak current generated by the storage device exceeds the current threshold of the storage device. In addition, compared with an existing method for reducing the peak current of the storage device by delaying write operations of data of some storage units or limiting a quantity of storage units that perform write operations of data in the same time period, the technical solution provided in this application may not affect bandwidth performance of a write operation of the storage device. Therefore, according to the technical solution provided in this application, the peak current of the storage device can be reduced while the bandwidth performance of the write operation of the storage device is ensured.

With reference to the first aspect, in some implementations of the first aspect, a rate at which the controller performs write operations of data on the M storage units is less than a rate at which the controller performs read operations of data on the M storage units. Based on the foregoing solution, current consumption generated when the storage performs write operations of data on the M storage units in the same time period can be reduced.

With reference to the first aspect, in some implementations of the first aspect, the storage unit includes a buffer and a storage array; and a rate at which the controller performs a write operation of data on the buffer is greater than a rate at which the buffer performs a write operation of data on the storage array. Based on the foregoing solution, it can be ensured that a cycle of performing a write operation of data by the storage device is not prolonged, and the bandwidth performance of the write operation of the storage device is not affected.

With reference to the first aspect, in some implementations of the first aspect, the method further includes: In a time period in which current consumption of the storage device is less than the current threshold, the controller performs write operations of data on P storage units by using a maximum of L data channels, where P is a positive integer greater than M and less than or equal to Q. When M is less than Q, in the time period in which the current consumption of the storage device is less than the current threshold, the controller appropriately increases a quantity of storage units that perform write operations of data in the same time period, to improve the bandwidth performance of the write operation of the storage device.

According to a second aspect, a controller is provided and used in a storage device. The storage device includes the controller and Q storage units. The controller is connected to the Q storage units by using N data channels, N is a positive integer greater than or equal to 2, and Q is a positive integer greater than or equal to N. The controller includes a control circuit, configured to determine, based on a current threshold of the storage device, current consumption of performing write operations of data by M storage units in the Q storage units in a same time period, and current consumption of performing write operations of data on the M storage units by using a single data channel in the N data channels, a maximum quantity L of data channels used in the same time period to perform write operations of data on the M storage units, where L is a positive integer less than N, and M is a positive integer less than or equal to Q. The control circuit is further configured to perform write operations of data on the M storage units by using a maximum of L data channels in the same time period.

With reference to the second aspect, in some implementations of the second aspect, a rate at which the control circuit performs write operations of data on the M storage units is less than a rate at which the control circuit performs read operations of data on the M storage units.

With reference to the second aspect, in some implementations of the second aspect, the storage unit includes a buffer and a storage array; and a rate at which the control circuit performs a write operation of data on the buffer is greater than a rate at which the buffer performs a write operation of data on the storage array.

With reference to the second aspect, in some implementations of the second aspect, the control circuit is further configured to: in a time period in which current consumption of the storage device is less than the current threshold, perform, by the control circuit, write operations of data on P storage units by using a maximum of L data channels, where P is a positive integer greater than M and less than or equal to Q.

According to a third aspect, a storage device is provided and includes a controller and Q storage units. The controller is connected to the Q storage units by using N data channels, N is a positive integer greater than or equal to 2, and Q is a positive integer greater than or equal to N. The controller is configured to determine, based on a current threshold of the storage device, current consumption of performing write operations of data by M storage units in the Q storage units in a same time period, and current consumption of performing write operations of data on the M storage units by using a single data channel in the N data channels, a maximum quantity L of data channels used in the same time period to perform write operations of data on the M storage units, where L is a positive integer less than N, and M is a positive integer less than or equal to Q. The controller is further configured to perform write operations of data on the M storage units by using a maximum of L data channels in the same time period.

With reference to the third aspect, in some implementations of the third aspect, a rate at which the controller performs write operations of data on the M storage units is less than a rate at which the controller performs read operations of data on the M storage units.

With reference to the third aspect, in some implementations of the third aspect, the storage unit includes a buffer and a storage array; and a rate at which the controller performs a write operation of data on the buffer is greater than a rate at which the buffer performs a write operation of data on the storage array.

With reference to the third aspect, in some implementations of the third aspect, the controller is further configured to: in a time period in which current consumption of the storage device is less than the current threshold, perform write operations of data on P storage units by using a maximum of L data channels, where P is a positive integer greater than M and less than or equal to Q.

According to a fourth aspect, a computer device is provided and includes a circuit board, a housing, and the storage device according to the third aspect. The storage device is connected to the circuit board, and the circuit board is disposed in the housing.

According to a fifth aspect, a controller is provided and includes a processor and a transceiver. The transceiver is configured to: receive computer code or instructions, and transmit the computer code or the instructions to the processor, and the processor runs the computer code or the instructions, to implement the method according to the first aspect or any possible implementation of the first aspect.

According to a sixth aspect, a computer-readable storage medium is provided. The computer-readable medium stores a computer program, and when the computer program is run on a computer, the computer is enabled to perform the method according to any one of the first aspect and the possible implementations of the first aspect.

According to a seventh aspect, a computer program product is provided and includes a computer program. When the computer program is executed by a computer, the method according to any one of the first aspect and the possible implementations of the first aspect is implemented.

The solutions provided in the second aspect to the seventh aspect are used to implement or cooperatively implement the method provided in the first aspect, and therefore can achieve advantageous effects the same as or corresponding to those in the first aspect. Details are not described herein.

BRIEF DESCRIPTION OF DRAWINGS

FIG. 5 is a schematic flowchart of a data read/write method according to an embodiment of this application;

FIG. 6 is a block diagram of dynamically adjusting a quantity of data channels used by a controller in a same time period to perform write operations of data on M storage units according to an embodiment of this application;

FIG. 7 is a schematic flowchart of a method for determining a quantity of data channels used by a controller in a same time period to perform write operations of data on M storage units according to an embodiment of this application;

FIG. 8 is a diagram of decreasing interface rates of an interface of a controller and an interface of a storage unit in a write direction according to an embodiment of this application;

FIG. 9 is a diagram of a waveform of current consumption of a storage device according to an embodiment of this application;

DESCRIPTION OF EMBODIMENTS

The technical solutions in this application are described below with reference to the accompanying drawings.

Embodiments of this application may be used in various solid-state storage devices, for example, a solid state disk (solid state disk, SSD), a universal flash storage (universal flash storage, UFS), a secure digital card (secure digital card, SD Card), an embedded multimedia card (embedded multimedia card, eMMC), a customized type of storage device, and other types of storage devices. For example, the embedded multimedia card is used and includes a digital camera memory card, an MP3 walkman memory card, a compact USB flash drive, and the like.

Figure 1:
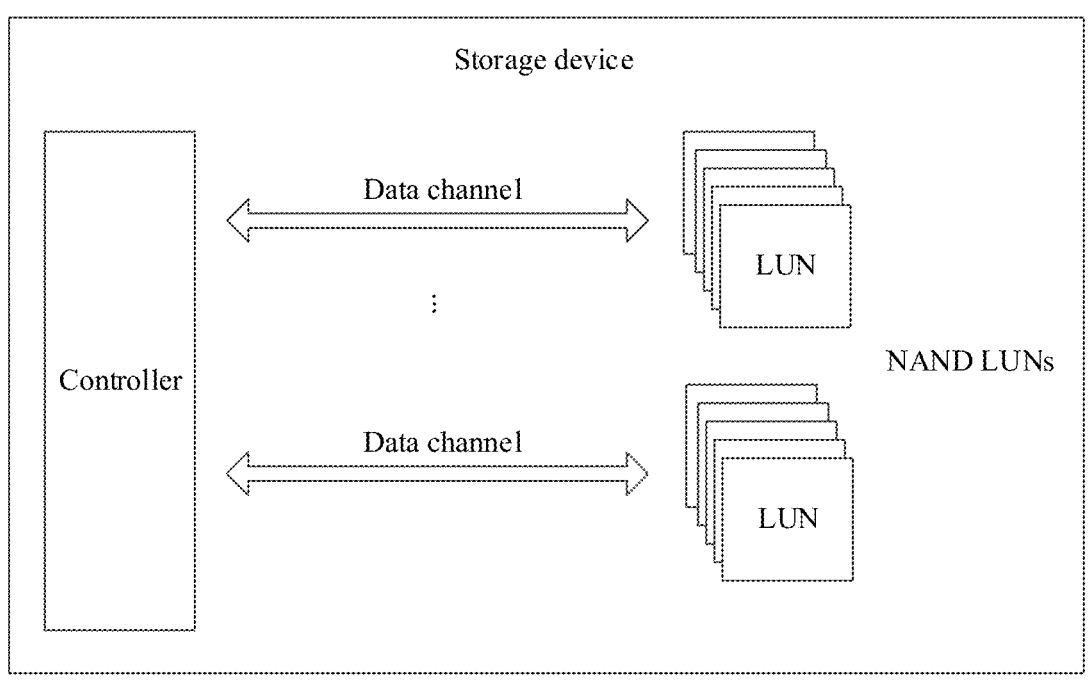
FIG. 1 is a diagram of a structure of a storage device.
Figure 2:
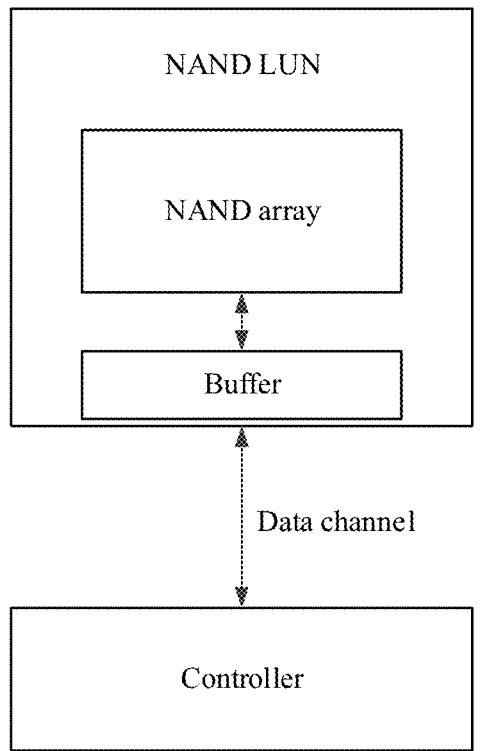
FIG. 2 is a diagram of a structure of a NAND LUN connected to a controller.

The solid-state storage device mainly includes a controller and several NAND LUNs. Each NAND LUN includes a buffer and a NAND array. In this application, the solid-state storage device may be briefly referred to as a storage device or a NAND, and the NAND LUN may be briefly referred to as a LUN. FIG. 1 is a diagram of a structure of a storage device. FIG. 2 is a diagram of a structure of a NAND LUN connected to a controller. The controller usually has a plurality of data channels, and each data channel may be connected to a plurality of NAND LUNs to increase a storage capacity of the storage device. In addition, NAND array concurrent operations of a plurality of NAND LUNs may be used to improve read/write bandwidth performance of the storage device. The NAND LUN may also be referred to as a NAND die (die), and the data channel may also be referred to as a NAND bus. The NAND array concurrent operations mean that buffers in the plurality of NAND LUNs perform write operations or read operations of data on corresponding NAND arrays in a same time period. In this application, the same time period may be understood as a same moment or a same time.

The storage device has a very high requirement on power consumption. To ensure power integrity of the storage device, an application platform usually limits a peak value of current consumption $I_{CC}$ corresponding to a power supply voltage VCC of a power supply circuit of the storage device, to avoid system failure caused due to an excessively large voltage drop in a power supply line. The current consumption $I_{CC}$ of the storage device is mainly from two aspects: data DMA concurrent operations of a plurality of data channels and the NAND array concurrent operations of the plurality of NAND LUNs. After current consumption generated in the two aspects is added, the current consumption may exceed a limit of peak power consumption/a peak current of the storage device in some time periods. The data DMA concurrent operations mean that the controller performs write operations or read operations of data on a plurality of NAND LUNs by using the plurality of data channels in a same time period.

Currently, to ensure that a power supply of the storage device stably supplies power at any moment in a read/write operation process of the storage device, a method in which a quantity of NAND LUNs that write data temporarily stored in buffers into NAND arrays in a same time period is limited or a time of performing write operations of data on corresponding storage arrays by buffers in some NAND LUNs is delayed may be used to directly limit a source of the peak current. However, this results in a prolonged cycle of a write operation of the storage device and deterioration of bandwidth performance of the write operation of the storage device.

Specifically, system manufacturers in the industry usually have two methods to control the peak power consumption/peak current of the storage device. One method is to directly use a peak power management (peak power management, PPM) function feature of an original NAND medium to delay NAND array concurrent operations of some NAND LUNs. The other method is to directly limit, based on system-level firmware (firmware, FW) development, a quantity of NAND LUNs that perform NAND array concurrent operations, so that the storage device meets a requirement of the peak power consumption/peak current. It should be understood that a lower peak current indicates lower peak power consumption, and a higher peak current indicates higher peak power consumption.

(1) NAND PPM Solution

Figure 3:
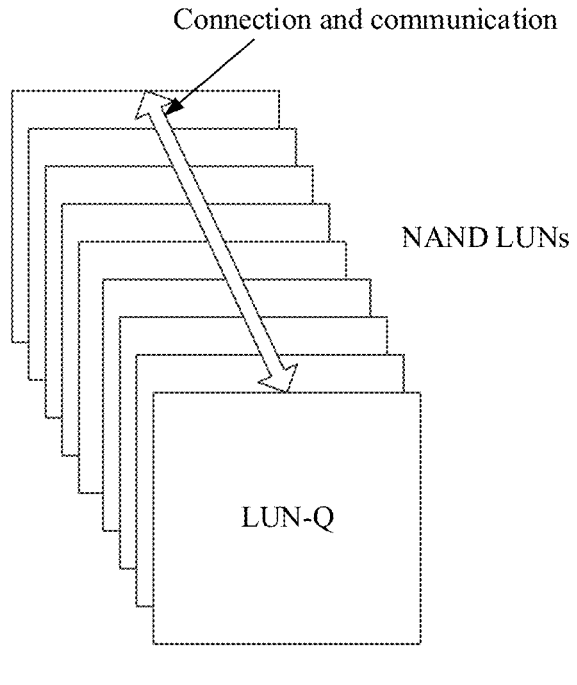
FIG. 3 is a diagram of a connection between different NAND LUNs in a NAND PPM solution.

FIG. 3 is a diagram of a connection between different NAND LUNs in the NAND PPM solution. A connection and communication are established between Q NAND LUNs by using NAND internal control logic designed by the manufacturer, to manage NAND array concurrent operations of the NAND LUNs. NAND array concurrent operations of some NAND LUNs are delayed, to stagger peak currents generated by NAND array operations of different NAND LUNs, so as to reduce the peak power consumption/peak current of the storage device. Herein, Q is a positive integer greater than 2.

Figure 4:
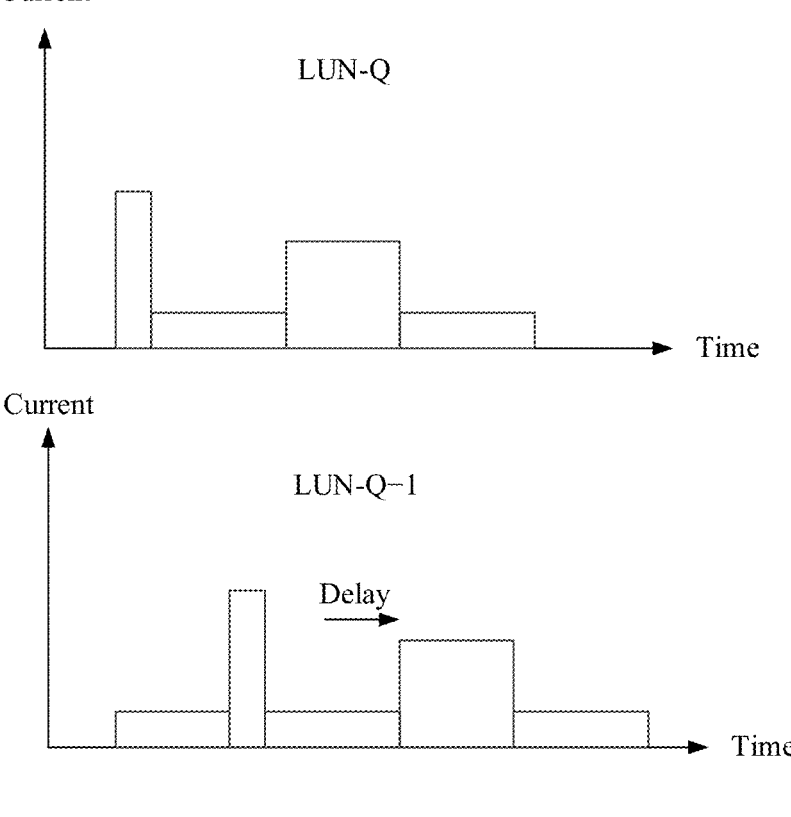
FIG. 4 is a diagram of delay management of a NAND array concurrent operation.

FIG. 4 is a diagram of delay management of a NAND array concurrent operation. A horizontal coordinate represents time, and a vertical coordinate represents a magnitude of a current. A NAND array concurrent operation of a NAND LUN-Q–1 is delayed, so that a peak current generated by a NAND array concurrent operation of a NAND LUN-Q is staggered with a peak current generated by the NAND array concurrent operation of the NAND LUN-Q–1, to reduce the peak power consumption of the storage device.

(2) The controller cooperates with FW software, to directly limit a quantity of NAND LUNs that perform NAND array concurrent operations at each moment, so as to reduce the peak power consumption of the storage device.

For the NAND PPM solution, in various scenarios and in cases of various configuration parameters, NAND array concurrent operations of some NAND LUNs are directly delayed. Therefore, a delay in a read/write operation is caused to some extent, affecting bandwidth performance of the read/write operation of the NAND. The peak current and the bandwidth performance of the read/write operation need to be balanced based on a specific application situation. For the solution of directly limiting, by using FW software, the quantity of NAND LUNs that perform NAND array concurrent operations, the bandwidth performance of the read/write operation is also affected.

In a current read/write process of the NAND, a data DMA operation on another word line (word line, WL)/page (page) of another NAND LUN is pre-embedded into a latency (latency) of a NAND array operation of a current NAND LUN by using a NAND LUN interleaving operation. For example, one data channel is connected to a plurality of NAND LUNs, and the plurality of NAND LUNs include a first NAND LUN and a second NAND LUN. After the controller performs a write operation of data on the first NAND LUN by using the data channel, the data is temporarily stored in a buffer in the first NAND LUN, and then the buffer in the first NAND LUN performs a write operation of data on a NAND array in the first NAND LUN. In a process in which the buffer in the first NAND LUN performs the write operation of data on the NAND array in the first NAND LUN, the controller performs a write operation of data on the second NAND LUN by using the data channel. This may be understood as that a data DMA operation on the second NAND LUN and a NAND array operation of the first NAND LUN are simultaneously performed, to effectively shorten a write cycle and improve sequential write bandwidth.

In a current read/write operation process of the NAND, a data DMA operation on another WL/page of a NAND LUN may be pre-embedded into a latency of a NAND array operation of the NAND LUN by using a cache (Cache) read/write operation. The cache read/write operation includes a cache read (Cache read) operation and a cache write (Cache program) operation. For example, one data channel is connected to one NAND LUN. After the controller performs a write operation of first data on the NAND LUN by using the data channel, the first data is temporarily stored in a buffer in the NAND LUN, and then the buffer in the NAND LUN performs a write operation of the first data on a NAND array in the NAND LUN. In a process in which the buffer in the NAND LUN performs the write operation of the first data on the NAND array in the NAND LUN, the controller performs a write operation of second data on the NAND LUN by using the data channel. This may be understood as that a data DMA operation on the NAND LUN and a NAND array operation of the NAND LUN are simultaneously performed, to effectively shorten a write cycle and improve sequential write bandwidth.

Generally, in a current storage device, a latency of performing a read operation of data on a NAND array by a buffer is much shorter than a latency of performing a write operation of data on the NAND array by the buffer. This may be understood as that a time required for the buffer in a NAND LUN to perform a read operation of data on the NAND array in the NAND LUN is much shorter than a time required for the buffer in the NAND LUN to perform a write operation of data on the NAND array in the NAND LUN. In addition, in a case of a specific interface parameter configuration of the controller and the NAND LUN, a time required for a NAND array operation in a data write process is longer than a time required for a data DMA operation. That is, the time required for the buffer in the NAND LUN to perform a write operation of data on the NAND array in the NAND LUN is longer than a time required for the controller to perform a write operation of data on the NAND LUN. Therefore, bandwidth performance of a data channel is severely excessive in a process of performing a write operation, that is, the data channel is sometimes in an idle state in the process of performing a write operation. Without affecting bandwidth performance of a write operation of the storage device, there is still some room for flexibly managing a data DMA concurrent operation to reduce a peak current/peak power consumption of the storage device.

Therefore, embodiments of this application provide a data read/write method, to reduce a peak current of a storage device while ensuring bandwidth performance of a write operation of the storage device. The current consumption in embodiments of this application is current consumption corresponding to power supply VCC. In embodiments of this application, the storage device may be a NAND, the storage unit may be a NAND LUN, the buffer may be a buffer in the NAND LUN, the storage array may be a NAND array in the NAND LUN, the interface of the storage unit may be a NAND flash interface (NAND flash interface, NFI), and the interface of the controller is a direct memory access interface of the controller.

FIG. 5 is a schematic flowchart of a data read/write method 500 according to an embodiment of this application. The method is applied to a storage device. The storage device includes a controller and Q storage units. The controller is connected to the Q storage units by using N data channels. The controller may be connected to one or more storage units by using each data channel. Each data channel may be connected to a same or different quantity of storage units. N is a positive integer greater than or equal to 2, and Q is a positive integer greater than or equal to N.

510: The controller determines, based on a current threshold of the storage device, current consumption of performing write operations of data by M storage units in the Q storage units in a same time period, and current consumption of performing write operations of data on the M storage units by the controller by using a single data channel in the N data channels, a maximum quantity L of data channels used by the controller in the same time period to perform write operations of data on the M storage units, where L is a positive integer less than N, and M is a positive integer less than or equal to Q. It should be understood that although the controller is connected to the Q storage units by using the N data channels, the controller performs read/write operations of data on the M storage units in the Q storage units based on a transmission requirement.

That a storage unit performs a write operation of data may be understood as that a buffer in the storage unit performs a write operation of data on a storage array in the storage unit. In addition, the buffer in the storage unit performs the write operation of data on the storage array in the storage unit under control of a control circuit of the storage unit. That the controller performs a write operation of data on a storage unit may be understood as that the controller performs a write operation of data on a buffer in the storage unit. The same time period may be understood as a same moment or a same time.

To ensure normal working of the storage device, current consumption of the storage device is limited, and a peak current generated when the storage device performs a write operation of data and a read operation of data cannot exceed the current threshold of the storage device. The current threshold of the storage device is maximum current consumption that corresponds to power supply VCC and that the storage device can withstand. The current threshold of the storage device is usually determined based on a power design capability of the storage device. High current consumption is generated when the controller performs write operations of data on the M storage units by using the N data channels in the same time period, and a larger quantity of data channels used by the controller in the same time period indicates higher current consumption generated by the storage device. Therefore, the controller may adjust the quantity of data channels used in the same time period to perform write operations of data on the M storage units, to avoid a case in which a peak current generated by the storage device exceeds the current threshold of the storage device.

The current consumption of performing write operations of data by the M storage units in the same time period and the current consumption of performing write operations of data on the M storage units by the controller by using a single data channel are obtained through current detection.

Optionally, the controller includes a current detection module, a current calculation module, a storage module, and a timer corresponding to each storage unit. The current detection module is configured to detect current consumption generated in a process in which a buffer in a storage unit performs a write operation of data on a storage array in the storage unit. The current calculation module is configured to calculate the quantity of data channels used by the controller in the same time period to perform write operations of data on the M storage units. The storage module is configured to store current consumption timetables of different storage units and the quantity of data channels used by the controller in the same time period to perform write operations of data on the M storage units. Optionally, the storage module may store quantities of data channels used by the controller to perform write operations of data on the M storage units at a plurality of moments. The controller may adjust and manage a granularity of a data DMA concurrent write operation based on an actual application scenario. Limiting the granularity of the data DMA concurrent write operation may be understood as determining a time interval at which the quantity of data channels used by the controller in the same time period to perform write operations of data on the M storage units. The granularity includes a codeword length (codeword), a page size (page-size), and a multi-plane concurrent page size (multi-plane page). FIG. 6 is a block diagram of dynamically adjusting the quantity of data channels used by the controller in the same time period to perform write operations of data on the M storage units.

Optionally, at a current moment, the controller determines, based on the current threshold of the storage device, the current consumption of performing write operations of data by the M storage units, and the current consumption of performing write operations of data on the M storage units by the controller by using a single data channel, a quantity L of data channels used by the controller in a future time period to perform write operations of data on the M storage units.

For example, at the current moment, the controller may determine, based on the current threshold of the storage device, a current consumption timetable of each storage unit in a process in which the M storage units perform write operations of data, and the current consumption of performing write operations of data on the M storage units by the controller by using a single data channel, the maximum quantity L of data channels used by the controller in the future time period to perform write operations of data on the M storage units. The current consumption timetable of the storage unit indicates current consumption at different moments in a process in which a buffer in the storage unit performs a write operation of data on a storage array in the storage unit. Current consumption timetables of all the storage units may be considered to be the same, that is, current consumption of different storage units at the same moment is the same.

The current consumption timetable of the storage unit is a digitalized current consumption timetable obtained based on a current curve of the storage unit obtained through testing in the process in which the buffer in the storage unit performs a write operation of data on the storage array. To avoid an error of the current consumption timetable caused due to a service life, the controller may regularly or irregularly update the current consumption timetable of each storage unit, to obtain the current consumption timetable of each storage unit in an entire life cycle of the storage device. The current consumption timetable of the storage unit obtained through testing is usually stored in the storage unit.

When the controller needs to use the current consumption timetable, the controller reads the current consumption timetable from the storage unit, and stores the current consumption timetable in a running memory of the controller. It should be understood that when an interface rate of an interface of the storage unit and/or an interface rate of a direct memory access interface of the controller remain/ remains unchanged, current consumption generated in a process of transmitting data and performing write operations of data on the M storage units by using each data channel is considered to be the same at different moments.

For example, the controller may obtain, based on the current consumption timetable of the storage unit, current consumption $I_{m,\,t}$ generated when the buffer in each storage unit performs a write operation of data on the storage array in the storage unit at different moments in the future time period, where m represents a different storage unit, and t represents a different moment. The controller performs summation calculation on $I_{m,\,t}$ of the M storage units at a moment t, to obtain a sum $I_{SUM,t}$ of current consumption generated when the M storage units perform write operations of data at the moment t. The controller determines, based on the following formula (1), a maximum quantity L of data channels used by the controller to perform write operations of data on the M storage units at the moment t:

$$L = \left\lfloor (I_{limit} - I_{SUM,t})/ICC_{DMA} \right\rfloor \tag{1}$$

Herein, $I_{limit}$ is the current threshold of the storage device, $I_{DMA}$ is the current consumption of performing write operations of data on the M storage units by the controller by using a single data channel, and $\lfloor\ \rfloor$ represents a floor function.

Current consumption $I_{m,\,t}$ generated when a buffer in an $m^{th}$ storage unit writes data into a storage array at the moment t may be an average value of current consumption generated in a process in which the buffer in the $m^{th}$ storage unit writes the data into the storage array in a time sub-period including the moment t. The time sub-period is a time in a future time period based on the current moment.

For example, the controller obtains, based on the current consumption timetable of the storage unit, current consumption $I_{m,\,t_0}$, $I_{m,\,t_1}$, $I_{m,\,t_2}$, . . . , and $I_{m,\,t_T}$ generated when each of the M storage units performs write operations of data at a moment $t_0$, a moment $t_1$, a moment $t_2$, . . . , and a moment $t_T$ in the future time period. The controller performs summation calculation on $I_{m,\,t_0}$ corresponding to the M storage units, to obtain a sum $I_{SUM,t_0}$ of current consumption generated when the M storage units perform write operations of data at the moment $t_0$. The controller obtains, by using a same summation calculation method, a sum $I_{SUM,t_1}$ of current consumption generated when the M storage units perform write operations of data at the moment $t_1$, a sum $I_{SUM,\,t_2}$ of current consumption generated when the M storage units perform write operations of data at the moment $t_2$, and a sum $I_{SUM,t_T}$ of current consumption generated when the M storage units perform write operations of data at the moment $t_T$. The controller determines, based on the foregoing formula (1), maximum quantities $L_{t0}$, $L_{t1}$, $L_{t2}$, . . . , and $L_{tT}$ of data channels respectively used by the controller to perform write operations of data on the M storage units at the moment $t_0$, the moment $t_1$, the moment $t_2$, . . . , and the moment $t_T$.

Specifically, the future time period may be divided into T+1 time sub-periods. The current consumption $I_{m,t_0}$ generated when each storage unit performs a write operation of data at the moment $t_0$ is equal to an average value of current consumption generated when the M storage units perform write operations of data in a first time sub-period; the current consumption $I_{m, t_1}$ generated when each storage unit performs a write operation of data at the moment $t_1$ is equal to an average value of current consumption generated when the M storage units perform write operations of data in a second time sub-period; the current consumption $I_{m, t_2}$ generated when each storage unit performs a write operation of data at the moment $t_2$ is equal to an average value of current consumption generated when the M storage units perform write operations of data in a third time sub-period; and the current consumption $I_{m, t_T}$ generated when each storage unit performs a write operation of data at the moment $t_T$ is equal to an average value of current consumption generated when the M storage units perform write operations of data in a $(T+1)^{th}$ time sub-period. For example, if a length of the future time period is 10 ms, the future time period may be evenly divided into 10 time sub-periods: a first time sub-period of 0 ms-1 ms, a second time sub-period of 1 ms-2 ms, a third time sub-period of 2 ms-3 ms, a fourth time sub-period of 3 ms-4 ms, a fifth time sub-period of 4 ms-5 ms, a sixth time sub-period of 5 ms-6 ms, a seventh time sub-period of 6 ms-7 ms, an eighth time sub-period of 7 ms-8 ms, a ninth time sub-period of 8 ms-9 ms, and a tenth time sub-period of 9 ms-10 ms.

Optionally, when $I_{limit}-I_{SUM,t}$ is greater than or equal to a first threshold, the controller determines that the maximum quantity of data channels used by the controller in the same time period to perform write operations of data on the M storage units is a first quantity; or when $I_{limit}-I_{SUM,t}$ is less than a first threshold, the controller determines that the maximum quantity of data channels used by the controller in the same time period to perform write operations of data on the M storage units is a second quantity. The first quantity is greater than or equal to the second quantity. It may be understood that a larger value of $I_{limit}-I_{SUM,t}$ indicates a larger quantity of data channels that can be used by the controller in the same time period to perform write operations of data on the M storage units; and a smaller value of $I_{limit}-I_{SUM,t}$ indicates a smaller quantity of data channels that can be used by the controller in the same time period to perform write operations of data on the M storage units.

520: The controller performs write operations of data on the M storage units by using a maximum of L data channels in the same time period. This may be understood as that the controller performs write operations of data on buffers in the M storage units by using a maximum of L data channels in the same time period. Correspondingly, the buffer in the storage unit performs a write operation of data on the storage array in the storage unit.

In the technical solution provided in this embodiment of this application, the controller determines, based on the current threshold of the storage device, the current consumption of performing write operations of data by the M storage units in the same time period, and the current consumption of performing write operations of data on the M storage units by the controller by using a single data channel, the maximum quantity L of data channels used by the controller in the same time period to perform write operations of data on the M storage units; and the controller performs write operations of data on the M storage units by using a maximum of L data channels in the same time period, to avoid a case in which a peak current generated by the storage device exceeds the current threshold of the storage device. In addition, compared with an existing method for reducing the peak current of the storage device by delaying write operations of data of some storage units or limiting a quantity of storage units that perform write operations of data in the same time period, the technical solution provided in this application may not affect bandwidth performance of a write operation of the storage device. Therefore, according to the technical solution provided in this application, the peak current of the storage device can be reduced while the bandwidth performance of the write operation of the storage device is ensured.

FIG. 7 is a schematic flowchart of a method for determining a quantity of data channels used by a controller in a same time period to perform write operations of data on M storage units.

710: The controller delivers write operation confirmation instructions to the M storage units, to trigger the storage units to start to perform write operations of data. It should be understood that after the controller completes a write operation of data on the storage unit, the data is temporarily stored in a buffer in the storage unit. The buffer in the storage unit starts to perform a write operation of data on a storage array in the storage unit only after the controller delivers the write operation confirmation instruction to the storage unit.

After delivering the write operation confirmation instructions, the controller starts to calculate a maximum quantity L of data channels used by the controller to simultaneously perform write operations of data on the M storage units in a future time period.

720: The controller queries a timing time of a timer corresponding to each storage unit. The controller allocates a timer to each storage unit. Each time the controller indicates, by using a programming confirmation instruction, the storage unit to perform a write operation of data, the timer corresponding to the storage unit starts corresponding timing.

730: The controller obtains, based on the timing time of the timer corresponding to each storage unit and a current consumption timetable of each storage unit, current consumption $I_{m, t}$ generated when each storage unit performs a write operation of data at a moment t in the future time period. It should be understood that a start moment of the timing time of the timer corresponding to the storage unit is a start moment of the current consumption timetable of the storage unit. Current consumption $I_{m, t}$ generated when an $m^{th}$ storage unit performs a write operation of data at the moment t may be an average value of current consumption generated when the $m^{th}$ storage unit performs a write operation of data in a time sub-period including the moment t. The time sub-period is a time in a future time period based on a current moment.

740: The controller performs summation calculation on current consumption $I_{i, t}$ generated when all the storage units perform write operations of data at the moment t, to obtain a sum $I_{SUM,t}$ of current consumption generated when the M storage units perform write operations of data at the moment t, where $$I_{SUM,t} = \sum_{m=1}^{M} I_{m,t}.$$

750: The controller calculates, based on a current threshold $I_{limit}$ of a storage device, current consumption $I_{DMA}$ generated when the controller performs write operations of data on the M storage units by using a single data channel, the sum $I_{SUM,t}$ of the current consumption generated when the M storage units perform write operations of data at the moment t, and the foregoing formula (1), a maximum quantity L of data channels used by the controller to perform write operations of data on the M storage units at the moment t.

760: The controller performs write operations of data on the M storage units by using a maximum of L data channels at the moment t.

To reduce current consumption of the storage device, in an implementation, the controller may appropriately decrease the quantity of data channels used in the same time period. For example, the controller may perform write operations of data on the M storage units by using $L_0$ data channels in the same time period, where $L_0$ is less than L. If the controller decreases the quantity of data channels used in the same time period, a peak current/peak power consumption of the storage device may be reduced.

Optionally, a rate at which the controller performs a write operation of data on the buffer in the storage unit is greater than a rate at which the buffer performs a write operation of data on the storage array, to ensure bandwidth performance of a write operation of the storage device. For example, a rate at which the controller performs write operations of data on buffers in the M storage units by using the $L_0$ data channels in the same time period is greater than a rate at which the buffers in the M storage units perform write operations of data on storage arrays in the M storage units in the same time period. It may be understood that for data of a specific data block size, a time required for the controller to perform write operations of the data on the M storage units by using the $L_0$ data channels is shorter than a time required for the buffers in the M storage units to perform write operations of the data on the storage arrays.

Specifically, $L_0$ meets the following formula (2):

$$N * S/L_0 * \left(U * D/F/E\right) \le T_{prog} \qquad (2)$$

Herein, N is a total quantity of data channels of the storage device, S is a quantity of storage units connected to one data channel, U is a quantity of storage planes included in one storage unit, D is a data amount included in a word line written into one storage plane (plane) at a time, F is an interface rate of the storage unit, E is interface efficiency of the storage unit, $T_{prog}$ is a time used for the M storage units to write data into the storage arrays, and S and U are positive integers.

While it is ensured that the rate at which the controller performs write operations of data on the M storage units is greater than the rate at which the buffers in the M storage units perform write operations of data on the storage arrays, the quantity of data channels used in the same time period is appropriately decreased. It is set that $N*S/L_0*(U*D/F/E) \le T_{prog}$, so that it can be ensured that a cycle of performing a write operation of data by the storage device is not prolonged, and the bandwidth performance of the write operation of the storage device is not affected. The quantity of data channels used by the controller to perform write operations of data on the M storage units in the same time period is appropriately decreased, so that the peak current/peak power consumption of the storage device can be reduced. Therefore, the peak current of the storage device can be reduced while the bandwidth performance of the write operation of the storage device is ensured.

It should be understood that when $N*S/L_0*(U*D/F/E) > T_{prog}$, although the peak current generated by the storage device can be reduced, the bandwidth performance of the write operation of the storage device is affected to some extent.

In another implementation, a higher rate at which the controller performs a write operation of data on the storage unit indicates higher current consumption generated by the storage device, and a lower rate at which the controller performs a write operation of data on the storage unit indicates lower current consumption generated by the storage device. Therefore, the controller may decrease the rate at which the controller performs a write operation of data on the storage unit, to reduce a peak current generated by the storage device. In a conventional storage device architecture, the rate at which the controller performs a write operation of data on the storage unit is the same as a rate at which the controller performs a read operation of data on the storage unit. Therefore, if the rate at which the controller performs a write operation of data on the storage unit is decreased, the rate at which the controller performs a write operation of data on the storage unit is less than the rate at which the controller performs a read operation of data on the storage unit.

For example, a rate at which the controller performs write operations of data on the M storage units is less than a rate at which the controller performs read operations of data on the M storage units. This may be understood as that a rate at which the controller performs write operations of data on buffers in the M storage units is less than a rate at which the controller performs read operations of data on the buffers in the M storage units.

Higher interface rates of an interface of the controller and an interface of the storage unit indicate a higher rate at which the controller performs a write operation of data on the storage unit and higher current consumption generated by the storage device. Lower interface rates of the interface of the controller and the interface of the storage unit indicate a lower rate at which the controller performs a write operation of data on the storage unit and lower current consumption generated by the storage device. In a current storage device, a time required for the controller to perform a write operation of data on the buffer in the storage unit is shorter than a time required for the buffer in the storage unit to perform a write operation of data on a storage array in the storage unit. Therefore, without affecting the bandwidth performance of the write operation of the storage device, interface rates of the interface of the controller and the interface of the storage unit in a write direction are appropriately decreased, so that the time required for the controller to perform a write operation of data on the buffer in the storage unit can be prolonged, to decrease a rate at which the controller performs a write operation of data on the buffer in the storage unit, so as to reduce the peak current generated by the storage device. FIG. 8 is a diagram of decreasing the interface rates of the interface of the controller and the interface of the storage unit in the write direction according to an embodiment of this application.

It should be understood that in the conventional storage device architecture, an interface rate of the interface of the controller in a read direction is the same as the interface rate of the interface of the controller in the write direction, that is, an interface rate of the interface of the storage unit in the read direction is the same as the interface rate of the interface of the storage unit in the write direction. In this embodiment of this application, the interface rates of the interface of the controller and the interface of the storage unit in the write direction can be appropriately decreased without affecting the bandwidth performance of the write operation of the storage device, to reduce the peak current of the storage device.

Specifically, when a rate at which the controller performs write operations of data on the buffers in the M storage units by using a maximum of L data channels in the same time period is greater than a rate at which the buffers in the M storage units perform write operations of data on storage arrays in the same time period, if the controller appropriately decreases the rate at which the controller performs write operations of data on the M storage units, the bandwidth performance of the write operation of the storage device is not affected, and the peak current generated by the storage device can be reduced.

Optionally, in a time period in which the current consumption of the storage device is less than the current threshold, the controller may perform write operations of data on P storage units by using a maximum of L data channels, where P is a positive integer greater than M and less than or equal to Q. In the time period in which the current consumption of the storage device is less than the current threshold, when it is ensured that the current consumption of the storage device does not exceed the current threshold, the controller appropriately increases a quantity of storage units that perform write operations of data, to improve the bandwidth performance of the write operation of the storage device. The current consumption of the storage device is obtained through current detection. The current consumption of the storage device is from two aspects: current consumption generated when the M storage units perform write operations of data in the same time period and current consumption generated when the controller performs write operations of data on the M storage units by using a maximum of L data channels in the same time period.

Current consumption is generated when the controller performs write operations of data on the M storage units by using a maximum of L data channels in the same time period. Therefore, current consumption is also generated when the M storage units perform write operations of data in the same time period. A larger quantity of data channels used by the controller in the same time period indicates higher current consumption generated by the storage device; and a larger quantity of storage units that perform write operations of data in the same time period indicates higher current consumption generated by the storage device. Therefore, the controller may determine, based on the current threshold of the storage device, the current consumption timetable of each storage unit, and the current consumption of performing write operations of data on the M storage units by the controller by using a single data channel, the quantity of data channels used by the controller in the same time period to perform write operations of data on the storage units and the quantity of storage units that perform write operations of data in the same time period, to avoid a case in which a peak current generated by the storage device exceeds the current threshold of the storage device.

For example, when the controller determines that a peak current generated by the storage device in a future time period or at a future moment is greater than or equal to the current threshold of the storage device, the controller may decrease a quantity of data channels used to perform write operations of data in the future time period or at the future moment. For example, when the controller determines that a peak current generated by the storage device in a future time period or at a future moment is greater than or equal to the current threshold of the storage device, the controller may decrease a quantity of data channels used to perform write operations of data in the future time period or at the future moment, and decrease a quantity of storage units that perform write operations of data in the future time period or at the future moment.

FIG. 9 is a diagram of a waveform of current consumption of the storage device according to an embodiment of this application. When the controller performs write operations of data on six storage units by using all data channels/the maximum quantity of data channels in the same time period, current consumption generated by the storage device may exceed the current threshold of the storage device in some time periods. Therefore, the controller needs to decrease a quantity of data channels used to perform write operations of data on the six storage units in the same time period, to reduce the peak current generated by the storage device.

The quantity of data channels used by the controller to perform write operations of data on the storage units in the same time period may be dynamically adjusted or dynamically decreased. If the quantity of data channels used by the controller to perform write operations of data on the six storage units in the same time period is dynamically adjusted/dynamically decreased, the current generated by the storage device does not exceed the current threshold of the storage device, but there is a large current margin between a trough of a waveform of the current consumption generated by the storage device and the current threshold. In this case, the quantity of storage units that perform write operations of data in the same time period may be appropriately increased, to improve the bandwidth performance of the write operation of the storage device when it is ensured that the current consumption generated by the storage device does not exceed the current threshold.

As shown in FIG. 9, if the controller dynamically adjusts/dynamically decreases a quantity of data channels used by the controller to perform write operations of data on eight storage units in the same time period, a current generated by the storage device does not exceed the current threshold of the storage device, and there is a small current margin between a trough of a waveform of the current consumption generated by the storage device and the current threshold. In this way, the bandwidth performance of the write operation of the storage device can be improved.

The data read/write method provided in embodiments of this application is described above. An execution body configured to perform the data read/write method is described below.

Figure 10:
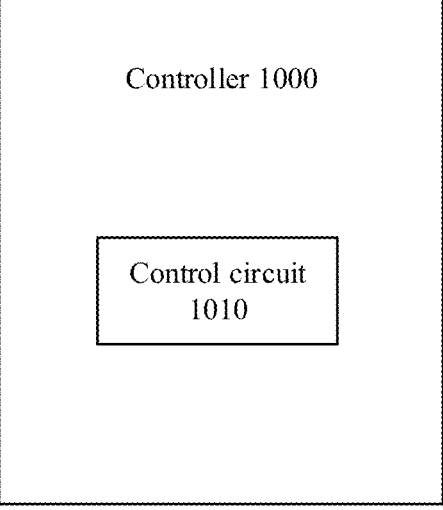
FIG. 10 is a block diagram of a controller according to an embodiment of this application.

An embodiment of this application provides a controller. FIG. 10 is a block diagram of a controller 1000 according to an embodiment of this application. The controller may be used in a storage device. The storage device includes the controller 1000 and Q storage units. The controller 1000 is connected to the Q storage units by using N data channels, N is a positive integer greater than or equal to 2, and Q is a positive integer greater than or equal to N. The controller 1000 includes:

a control circuit 1010, configured to determine, based on a current threshold of the storage device, current consumption of performing write operations of data by M storage units in the Q storage units in a same time period, and current consumption of performing write operations of data on the M storage units by using a single data channel in the N data channels, a maximum quantity L of data channels used in the same time period to perform write operations of data on the M storage units, where L is a positive integer less than N, and M is a positive integer less than or equal to Q.

The control circuit 1010 is further configured to perform write operations of data on the M storage units by using a maximum of L data channels in the same time period.

Optionally, a rate at which the control circuit performs write operations of data on the M storage units is less than a rate at which the control circuit performs read operations of data on the M storage units.

Optionally, the storage unit includes a buffer and a storage array; and a rate at which the control circuit 1010 performs a write operation of data on the buffer is greater than a rate at which the buffer performs a write operation of data on the storage array.

Optionally, the control circuit 1010 is further configured to: in a time period in which current consumption of the storage device is less than the current threshold, perform, by the control circuit, write operations of data on P storage units by using a maximum of L data channels, where P is a positive integer greater than M and less than or equal to Q.

Figure 11:
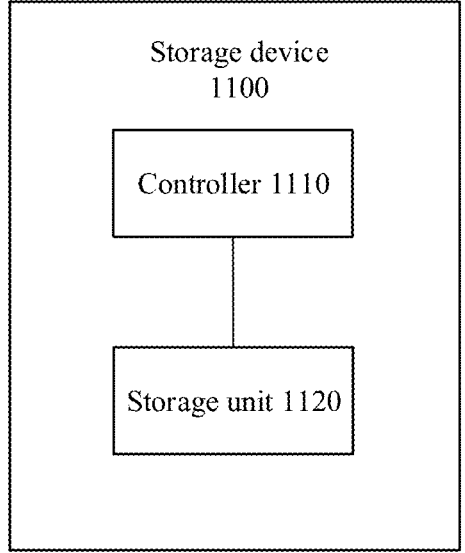
FIG. 11 is a block diagram of a storage device according to an embodiment of this application.

An embodiment of this application provides a storage device. FIG. 11 is a block diagram of a storage device 1100 according to an embodiment of this application. The storage device 1100 includes a controller 1110 and Q storage units 1120. The controller 1110 is connected to the Q storage units 1120 by using N data channels, N is a positive integer greater than or equal to 2, and Q is a positive integer greater than or equal to N.

The controller 1110 is configured to determine, based on a current threshold of the storage device, current consumption of performing write operations of data by M storage units in the Q storage units in a same time period, and current consumption of performing write operations of data on the M storage units by using a single data channel in the N data channels, a maximum quantity L of data channels used in the same time period to perform write operations of data on the M storage units, where L is a positive integer less than N, and M is a positive integer less than Q.

The controller 1110 is further configured to perform write operations of data on the M storage units by using a maximum of L data channels in the same time period.

Optionally, a rate at which the controller performs write operations of data on the M storage units is less than a rate at which the controller performs read operations of data on the M storage units.

Optionally, the storage unit includes a buffer and a storage array; and a rate at which the controller performs a write operation of data on the buffer is greater than a rate at which the buffer performs a write operation of data on the storage array.

Optionally, the controller 1110 is further configured to: in a time period in which current consumption of the storage device is less than the current threshold, perform write operations of data on P storage units by using a maximum of L data channels, where P is a positive integer greater than M and less than or equal to Q.

Figure 12:
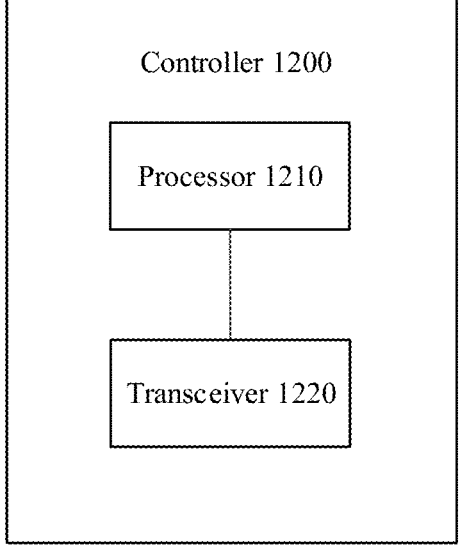
FIG. 12 is a block diagram of a controller according to an embodiment of this application.

An embodiment of this application provides a controller 1200. FIG. 12 is a block diagram of a storage device 1200 according to this embodiment of this application.

The device 1200 includes a processor 1210 and a transceiver 1220. The transceiver 1220 is configured to: receive computer code or instructions, and transmit the computer code or the instructions to the processor 1210. The processor 1210 runs the computer code or the instructions, for example, the method in any possible implementation in embodiments of this application.

Figure 13:
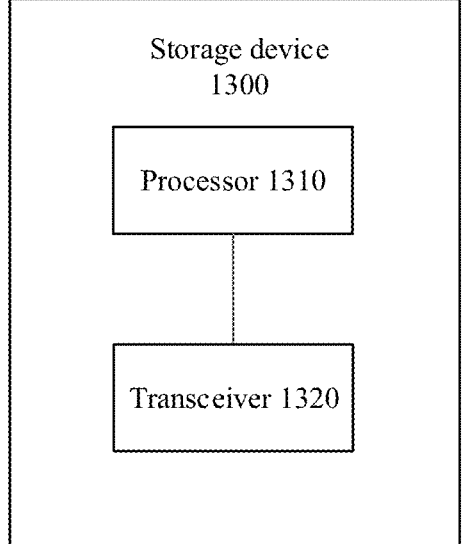
FIG. 13 is a block diagram of a storage device according to an embodiment of this application.

An embodiment of this application provides a storage device 1300. FIG. 13 is a block diagram of the storage device 1300 according to this embodiment of this application.

The device 1300 includes a processor 1310 and a transceiver 1320. The transceiver 1320 is configured to: receive computer code or instructions, and transmit the computer code or the instructions to the processor 1310. The processor 1310 runs the computer code or the instructions, for example, the method in any possible implementation in embodiments of this application.

The processor 1210 and the processor 1310 may be integrated circuit chips, and have signal processing capabilities. In an implementation process, the steps in the foregoing method embodiments may be completed by using an integrated logic circuit of hardware in a processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component, and may implement or perform the methods, steps, and logical block diagrams disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in a storage, and the processor reads information in the storage, and completes the steps in the foregoing methods in combination with the hardware in the processor.

An embodiment of this application further provides a computer device, including a circuit board, a housing, and the storage device in embodiments of this application. The storage device is connected to the circuit board, and the circuit board is disposed in the housing.

An embodiment of this application further provides a computer-readable storage medium. The computer-readable storage medium stores a computer program used to implement the method in the foregoing method embodiments. When the computer program is run on a computer or a processor, the computer or the processor is enabled to implement the method in the foregoing method embodiments.

An embodiment of this application further provides a computer program product. The computer program product includes computer program code, and when the computer program code is run on a computer, the method in the foregoing method embodiments is performed.

An embodiment of this application further provides a controller chip, including a processor. The processor is connected to a storage, the storage is configured to store a computer program, and the processor is configured to execute the computer program stored in the storage, to enable the chip to perform the method in the foregoing method embodiments.

A person of ordinary skill in the art may be aware that the example units, algorithms, and steps described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that this implementation goes beyond the scope of this application.

It may be clearly understood by a person skilled in the art that for convenient and brief description, for detailed working processes of the system, apparatus, and unit described above, refer to the corresponding processes in the foregoing method embodiments. Details are not described herein again.

In the several embodiments provided in this application, it should be understood that the disclosed device, apparatus, and method may be implemented in other manners. For example, the apparatus embodiment described above is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of embodiments.

In addition, functional units in embodiments of this application may be integrated into one processing unit, each unit may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk drive, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, applied to a storage device, wherein the storage device comprises a controller and Q storage units, the controller is connected to the Q storage units by using N data channels, N is a positive integer greater than or equal to 2, Q is a positive integer greater than or equal to N, and the method comprises:

determining, by the controller, a maximum quantity L of data channels used by the controller in a same time period to perform write operations of data on M storage units based on the following:

a current threshold of the storage device, current consumption of performing write operations of data by the M storage units of the Q storage units in the same time period, and current consumption of performing write operations of data on the M storage units by the controller by using a single data channel in the N data channels, wherein L is a positive integer less than N, and M is a positive integer less than or equal to Q; and performing, by the controller, write operations of data on the M storage units by using a maximum of L data channels in the same time period.

2. The method according to claim 1, wherein a rate at which the controller performs write operations of data on the M storage units is less than a rate at which the controller performs read operations of data on the M storage units.

3. The method according to claim 1, wherein a storage unit of the Q storage units comprises a buffer and a storage array; and a rate at which the controller performs a write operation of data on the buffer is greater than a rate at which the buffer performs a write operation of data on the storage array.

4. The method according to claim 1, wherein the method further comprises:

in a time period in which current consumption of the storage device is less than the current threshold, performing, by the controller, write operations of data on P storage units by using a maximum of L data channels, wherein P is a positive integer greater than M and less than or equal to Q.

5. The method according to claim 1, wherein the current threshold of the storage device is maximum current consumption that corresponds to a power supply and that the storage device can withstand.

6. The method according to claim 1, further comprising:

obtaining current consumption timetables of the M storage units, wherein a current consumption timetable of a storage unit of the M storage units indicates current consumption at different moments in a process in which a buffer in the storage unit performs a write operation of data on a storage array in the storage unit.

7. The method according to claim 6, further comprising:

obtaining, by the controller based on a current consumption timetable of each storage unit of the M storage units, current consumption generated when a buffer in the storage unit performs a write operation of data on a storage array in the storage unit at different moments in a predetermined time period.

8. A controller, used in a storage device, wherein the storage device comprises the controller and Q storage units, the controller is connected to the Q storage units by using N data channels, N is a positive integer greater than or equal to 2, Q is a positive integer greater than or equal to N, and the controller comprises:

a control circuit, configured to:

determine a maximum quantity L of data channels used in a same time period to perform write operations of data on M storage units based on the following:

a current threshold of the storage device, current consumption of performing write operations of data by the M storage units of the Q storage units in the same time period, and current consumption of performing write operations of data on the M storage units by using a single data channel in the N data channels, wherein L is a positive integer less than N, and M is a positive integer less than or equal to Q; and perform write operations of data on the M storage units by using a maximum of L data channels in the same time period.

9. The controller according to claim 8, wherein a rate at which the control circuit performs write operations of data on the M storage units is less than a rate at which the control circuit performs read operations of data on the M storage units.

10. The controller according to claim 8, wherein a storage unit of the Q storage units comprises a buffer and a storage array; and a rate at which the control circuit performs a write operation of data on the buffer is greater than a rate at which the buffer performs a write operation of data on the storage array.

11. The controller according to claim 8, wherein the control circuit is further configured to: in a time period in which current consumption of the storage device is less than the current threshold, perform, by the control circuit, write operations of data on P storage units by using a maximum of L data channels, wherein P is a positive integer greater than M and less than or equal to Q.

12. The controller according to claim 8, wherein the current threshold of the storage device is maximum current consumption that corresponds to a power supply and that the storage device can withstand.

13. The controller according to claim 8, wherein the controller is further configured to:

obtain current consumption timetables of the M storage units, wherein a current consumption timetable of a storage unit of the M storage units indicates current consumption at different moments in a process in which a buffer in the storage unit performs a write operation of data on a storage array in the storage unit.

14. The controller according to claim 13, wherein the controller is further configured to:

obtain, based on a current consumption timetable of each storage unit of the M storage units, current consumption generated when a buffer in the storage unit performs a write operation of data on a storage array in the storage unit at different moments in a predetermined time period.

15. A storage device, comprising a controller and Q storage units, wherein;

the controller is connected to the Q storage units by using N data channels, N is a positive integer greater than or equal to 2, and Q is a positive integer greater than or equal to N;

the controller is configured to:

determine a maximum quantity L of data channels used in a same time period to perform write operations of data on M storage units based on the following:

a current threshold of the storage device, current consumption of performing write operations of data by the M storage units of the Q storage units in the same time period, and current consumption of performing write operations of data on the M storage units by using a single data channel in the N data channels, wherein L is a positive integer less than N, and M is a positive integer less than or equal to Q; and perform write operations of data on the M storage units by using a maximum of L data channels in the same time period.

16. The storage device according to claim 15, wherein a rate at which the controller performs write operations of data on the M storage units is less than a rate at which the controller performs read operations of data on the M storage units.

17. The storage device according to claim 15, wherein a storage unit of the Q storage units comprises a buffer and a storage array; and a rate at which the controller performs a write operation of data on the buffer is greater than a rate at which the buffer performs a write operation of data on the storage array.

18. The storage device according to claim 15, wherein the controller is further configured to: in a time period in which current consumption of the storage device is less than the current threshold, perform write operations of data on P storage units by using a maximum of L data channels, wherein P is a positive integer greater than M and less than or equal to Q.

19. The storage device according to claim 15, wherein the controller is further configured to:

obtain current consumption timetables of the M storage units, wherein a current consumption timetable of a storage unit of the M storage units indicates current consumption at different moments in a process in which a buffer in the storage unit performs a write operation of data on a storage array in the storage unit.

20. The storage device according to claim 19, wherein the controller is further configured to:

obtain, based on a current consumption timetable of each storage unit of the M storage units, current consumption generated when a buffer in the storage unit performs a write operation of data on a storage array in the storage unit at different moments in a predetermined time period.

* * * * *